(12) United States Patent
Peng

(10) Patent No.: US 11,537,943 B2
(45) Date of Patent: Dec. 27, 2022

(54) DATA CENTER DISASTER CIRCUIT BREAKER UTILIZING MACHINE LEARNING

(71) Applicant: SAP SE, Walldorf (DE)

(72) Inventor: Yang Peng, Pleasanton, CA (US)

(73) Assignee: SAP SE, Walldorf (DE)

( * ) Notice: Subject to any disclaimer, the term of this patent is extended or adjusted under 35 U.S.C. 154(b) by 486 days.

(21) Appl. No.: 16/714,070

(22) Filed: Dec. 13, 2019

(65) Prior Publication Data

US 2021/0182732 A1 Jun. 17, 2021

(51) Int. Cl.
| | |
|---|---|
| *G06N 20/00* | (2019.01) |
| *G06N 5/04* | (2006.01) |
| *H04M 3/22* | (2006.01) |
| *G06N 5/00* | (2006.01) |
| *G06N 20/10* | (2019.01) |
| *G06N 20/20* | (2019.01) |

(52) U.S. Cl.
CPC .............. *G06N 20/00* (2019.01); *G06N 5/04* (2013.01)

(58) Field of Classification Search
CPC ............ G06N 20/00; G06N 5/04; G06N 3/08; G06N 5/003; G06N 20/10; G06N 20/20; H04M 3/2218; H04M 3/2227
See application file for complete search history.

(56) References Cited

U.S. PATENT DOCUMENTS

| | | | |
|---|---|---|---|
| 11,075,933 B1* | 7/2021 | Fetters | H04W 12/64 |
| 2019/0034256 A1* | 1/2019 | Fox | B60W 50/02 |
| 2019/0303791 A1* | 10/2019 | Yoshikawa | G06F 30/00 |
| 2021/0012239 A1* | 1/2021 | Arzani | H04L 43/50 |
| 2021/0056404 A1* | 2/2021 | Goswami | G06V 10/764 |
| 2021/0160257 A1* | 5/2021 | Elyashiv | H04L 63/1425 |
| 2021/0182385 A1* | 6/2021 | Roychowdhury | G06N 20/00 |

OTHER PUBLICATIONS

Breiman, "Random Forests," Machine Learning, vol. 45, pp. 5-32 (Oct. 2001).

* cited by examiner

*Primary Examiner* — Harry H Kim

(74) *Attorney, Agent, or Firm* — Klarquist Sparkman, LLP

(57) ABSTRACT

Calls received by a data center that are associated with a request are monitored. Features are subsequently extracted from the monitored calls so that a machine learning model may use such features to determine that the request will cause the data center to malfunction. The machine learning model can be trained using data derived from a transaction log for the data center. At least one correction action to prevent the data center from malfunctioning can then be initiated in response to such determination. Related apparatus, systems, techniques and articles are also described.

20 Claims, 3 Drawing Sheets

DATA CENTER DISASTER CIRCUIT BREAKER UTILIZING MACHINE LEARNING

TECHNICAL FIELD

The subject matter described herein relates to enhanced techniques for minimizing damage to data centers using machine learning.

BACKGROUND

Data centers are susceptible to various types of incidents which can negatively affect the data being stored therein as well as the related computing equipment. In particular, software malfunctions can cause the overall performance of a data center to be impacted so as to result in data loss (without the ability to restore) or service level agreement (SLA) performance issues. To minimize the risks associated with such incidents, data centers often have circuit breaker mechanisms to prevent data loss and to cut off malfunctioning nodes (e.g., computers, servers, etc.) after such failures are detected. These circuit breakers can be triggered, for example, if operation (e.g., transaction, API, etc.) failures hit a certain pre-defined level. The circuit breakers can also be triggered based on traffic monitoring and, in some cases, can cause data traffic to be rerouted to a different node within the data center.

SUMMARY

In a first aspect, calls received by a data center that are associated with a request are monitored. Features are subsequently extracted from the monitored calls so that a machine learning model may use such features to determine that the request will cause the data center to malfunction. The machine learning model can be trained using data derived from a transaction log for the data center. At least one correction action to prevent the data center from malfunctioning can then be initiated in response to such determination.

The corrective action can take many forms including activating additional nodes within the data center to handle the request and future requests and/or limiting or throttling subsequent calls or requests.

The machine learning model can take many forms including one or more of: a logistic regression model, a neural network, a support vector machine, or a random forest model. In some variations, the machine learning model outputs a classification can indicate whether the request is good or bad. In other variations, the machine learning model can output a numerical score over a pre-defined range (e.g., 0 to 100, −1 to +1, etc.).

The features that are extracted can include one or more of: pathway, implicated server, Hypertext Transfer Protocol (HTTP) status code, process time, central processing unit (CPU) consumption, processing time, number of exceptions, memory consumption, or number of data access calls.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for protecting data centers when software malfunctions.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to the use of machine learning in connection with data center protection (against software malfunctions and the like).

Figure 1:
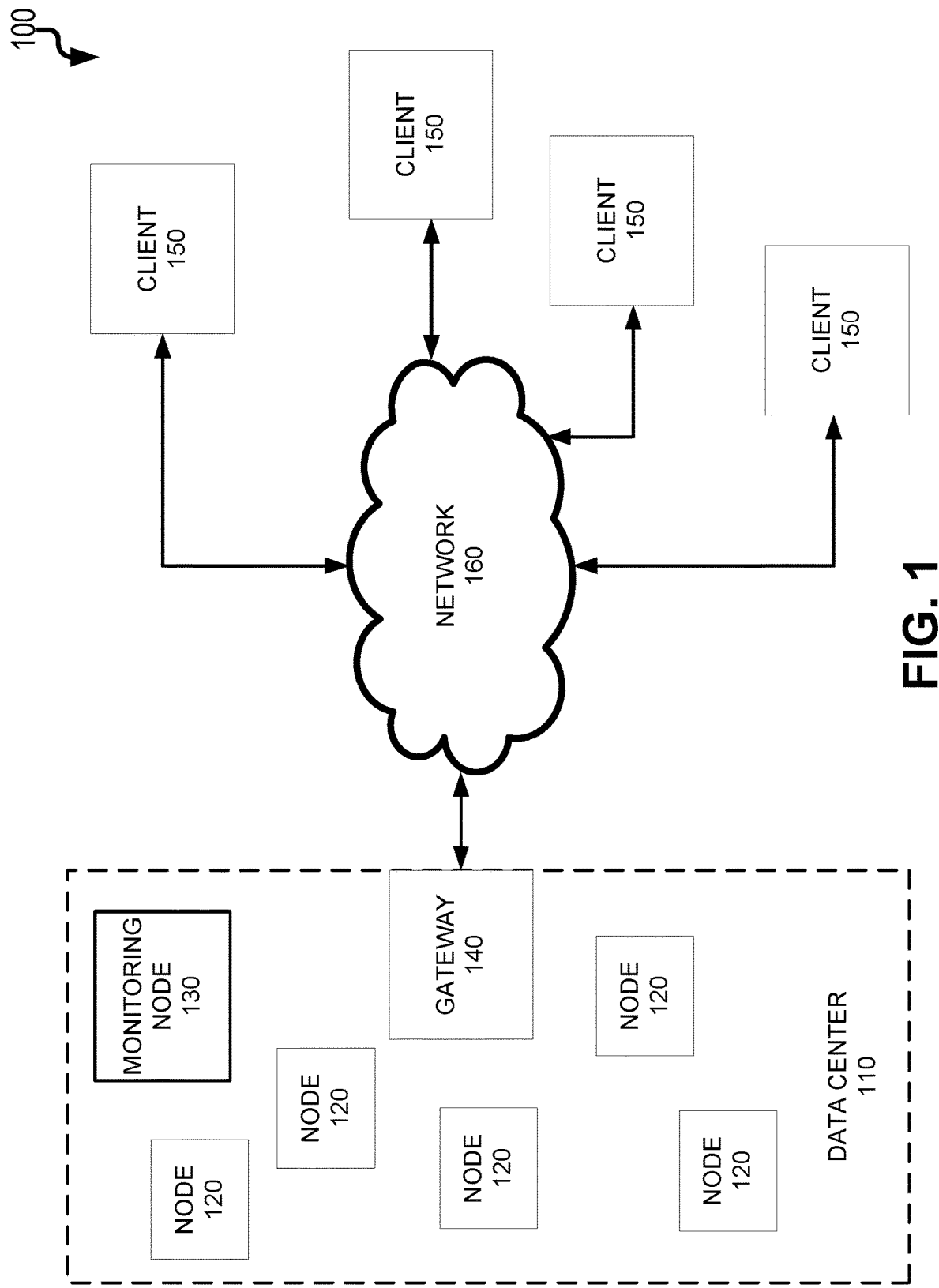
FIG. 1 is a diagram illustrating a data center architecture.

With reference to diagram 100 of FIG. 1, a data center 110 comprises a plurality of nodes 120 (i.e., computers, servers, databases, etc.) including a monitoring node 130. The data center 110 further comprises a gateway 140 by which it communicates with a variety of remote clients 150 (i.e., computing devices) over a network 160.

The monitoring node 130 acts to monitor traffic received through the gateway 140. For example, the monitoring node 130 can monitor for some (e.g., sample 10% of the calls, etc.) or all transactions/API calls, the associated data access commands as well as any associated exceptions. The monitoring node 130 can, as will be described in further detail below, execute at least one machine learning model (e.g., a single machine learning model, an ensemble of machine learning models, etc.) to classify such data access commands. In some cases, the machine learning model is executed external to the monitoring node 130. The classification of the data access commands can be binary (e.g., positive or negative) or it can be a score over a range (e.g., −1.0 to +1.0, etc.).

The monitoring by the monitoring node 130 can be implemented by dynamic code injection. For JAVA, the dynamic code injection is JAVAAGENT. In .NET, dynamic code injection is referred to as code injection and can also be implemented by other aspect oriented programming tools. This arrangement can reduce complexity when different purposed system try to integrated into application, to gather, control the behavior. As such, this arrangement also increases the modularity of the system. For example, if the goal is to limit calls per second of a function, it is not desirable to have a co-dependent situation with that function module (such as ask them to build in my limitation functions). Instead, the logic can be intercepted dynamically with a general approach in the runtime so as to create an aspect (threshold system) which is highly independent.

As will be appreciated, the nodes 120 of the data center 110 work collectively to execute a plurality of applications relating to data access, storage, and the like. Code can be injected into each such application so that some or all calls (e.g. native calls, etc.) received via the gateway 140 can be monitored. These calls can be limited to certain methods/logical units in some variations. The determination of which calls to monitor can be based on code complexity and/or logical patterns of the corresponding application. For example, code might only be injected against .dao. [public] because this section is the part that access databases and data integrity is a major concern for database. Alternatively, an application can be injected against .api. [public] as outgoing APIs can drag the whole system down before injection.

Below is an example of code prior to injection:

```
public static voice appLogic1(00){
    accessDB1{ };
    accessDB2{ };
    doMoreStuff{ };
}
```

Below is an example of code after injection:

```
public static voice appLogic1(00){
    trackThis{ };
    if(needCircuitBreak( ))throwCircuitBreakException( );
    accessDB1{ };
    accessDB2{ };
    doMoreStuff{ };
}
```

With these modifications, the injected code can intercept calls received via the gateway 140 and tag such calls. The information characterizing such calls can be stored locally, for example, on the monitoring node 130. The monitoring node 130 can then check if current call requires a circuit break operation and, if so, an exception can be thrown. Such exception might be captured by outside caller and, as such, important actions can be configured to have the same logic. The thrown exception can be maintained until the transaction/request specified by the corresponding call fails. Stated differently, when a condition is met (too many calls that may cause an overload, etc.), an exception such as information to produce an HTTP 500 page can be generated to indicate to a user that there are too many frequent calls, etc. Such a scenario a single-server behavior, or a cluster/datacenter behavior, depends on how the scenarios is integrated.

In addition, all application exceptions can be also injected to provide the capability for the monitoring node 130 to track exceptions during a transaction and it associated calls. With the data obtained from the calls and the exceptions, information is provided that can be used to characterize a current request. For example, with regard to call tracking, the data can be used to specify how many important calls is in a request. Further, one or more of the following can be tracked for a transaction: a requested path, the handling server (node 120) in the data center 110, a particular sequence of calls, HTTP status code, time to process the call, CPU capacity information, number of exceptions, amount of consumed memory, a number of calls.

With the tracking data, each request (i.e., transaction) can be assigned a separate identifier (ID). Table 1 below provides example tracking data.

TABLE 1

| Req ID | URL | Server | HTTP Status | Process Time | CPU | Exceptions | Memory | Data Access Calls |
|---|---|---|---|---|---|---|---|---|
| 1 | /api/v2/platform/getUser | 0 | 200 | 19 ms | 40% | 0 | 1 GB | 3 |
| 3 | /api/v2/platform/createUser | 0 | 200 | 230 ms | 50% | 1 | 1.3 GB | 20 |
| 133 | /home/state | 1 | 500 | 400 ms | 93% | 3 | 2 GB | 5 |
| 20 | /api/v2/ec/syncData | 0 | 200 | 22 ms | 45% | 0 | 1.1 GB | 2 |
| 50 | /api/v2/ec/validateWorkflow | 0 | 200 | 220 ms | 17% | 2 | 2.3 GB | 1 |

While the information in Table 1 (e.g., HTTP status, exception numbers, calls, etc.) can provide some useful insight, it cannot always be used to determine whether or not a transaction is healthy. With the current subject matter, such information can be used as features to be consumed by at least one machine learning model (trained using historical call related data) which, in turn, can provide an output characterizing the calls (e.g., a score, a classification, etc.). This output can then be used, for example, by the monitoring node 130 to take corrective action (e.g., trigger a circuit breaker, reroute data, quarantine a node 110, etc.) to prevent data loss.

The machine learning models can take various forms (e.g., logistic regression, neural network, support vector machine, random forest, etc.) and can be trained using historical data. Such training data can, for example, be derived from historical calls to the data center 110 via the gateway 140 which are known to be safe and which are known to have caused a malfunction to software and/or equipment. Such historical data can, for example, be from or derived from a transaction log in the data center 110. The training data can include, for example: call sequence (with each call being assigned a unique ID) which can be hierarchical or in a flat array/vector, number of exceptions, HTTP status, memory usage, HTTP status code, etc.

The monitored data can be categorized into groups. These groups can, for example, be used to inform the machine learning model and/or, in some cases, there can be differently trained machine learning models for the various groups. The requests can be group using, for example, auto clustering and can be based on various attributes such as those listed in Table 1 (e.g., HTTP status, process time, memory, data calls, path etc.). As one example, the groups can be based by the path (i.e., URL, etc.) pattern. For example, /api/v2/platform/getUser and /api/v2/platform/validateUser can be assigned to the same category. This clustering means that those calls belonging to a same grade of API consume similar amounts of processing/network/memory resources.

For each group, the patterns on servers, and based on memory/CPU usage, the machine learning model(s) can determine if the current data traffic pattern through the gateway 140 is healthy or not. Based on the labels on each traffic pattern from each API category, those traffic patterns can be labeled as good or bad such as in Table 2 below). This information can be used to continually inform the machine learning model(s) so that future requests can be properly classified.

TABLE 2

| Request Number | Node Number | Status |
| --- | --- | --- |
| 1 | 1 | Good |
| 2 | 2 | Bad |
| 3 | 3 | Good |

The machine learning model(s) can be trained using such labeled data (i.e., supervised learning, etc.) so that subsequent requests can be monitored as indicated above. The machine learning model(s) can be used to take various corrective action as may be needed if the corresponding request is classified as being negative/anomalous. For example, if request A /api/v2/platform/getUser pattern reaches 100 requests per second, the machine learning model can classify this situation as anomalous and/or as an overload because the API of the data center 110 is normally micro-service architecture-based (i.e., certain servers may not carry certain type of APIs) so the traffic model is more easy to predict. Corrective action can then be taken to limit or throttle the requests (e.g., limit requests per second, etc.) and/or workers can be put into sleep for a certain amount of time until the requests are below a certain threshold and/or requests can be queued until there are sufficient available workers.

Given a cluster (group of servers), the machine learning model can determine that if an API request A pattern reach 200 requests/second, while request B reaches 300 request/second, the data center 110 is likely to have a jammed traffic or a server overload situation. In other words, situations may occur when there are too many concurrent, resource-sensitive requests. As different API requests may cause different loads (it has subsequent API calls, DB calls, different memory/CPU usage), the pattern of usage corresponding pattern of usage needs to be identified (e.g. if request URL A and B meet 200, then there is a possibility of overload, but if request URL C and D hit 1000, there is no concern for overload, etc.).

The output of the machine learning model can then be used to initiate a corrective action such as limiting or throttling further incoming traffic. In addition or in the alternative, alerts can be provided to a user (e.g., operations team) indicating that the server capacity of the data center 110 should be increased (e.g., by adding more API A and API B type nodes 120).

Give a certain time, the machine learning model can be used to make a determine that if a certain distribution of request categories (A 10%, B 20%, C 30%, D 25%, E 15%) indicates that the data center 110 will be experienced heavy load. This information can then be used to allocate resources (i.e., resource planning can be performed, etc.) to handle such requests more efficiently. For example, at the end of month, feature I is heavily used, then the machine learning model can provide a suggested resource distribution server type A: 20%, type B 30%, type C 50% at the beginning of month, and if feature II is heavily used, then the server type should be adjusted to type A: 40%, type B 20%, type C 40%.

Figure 2:
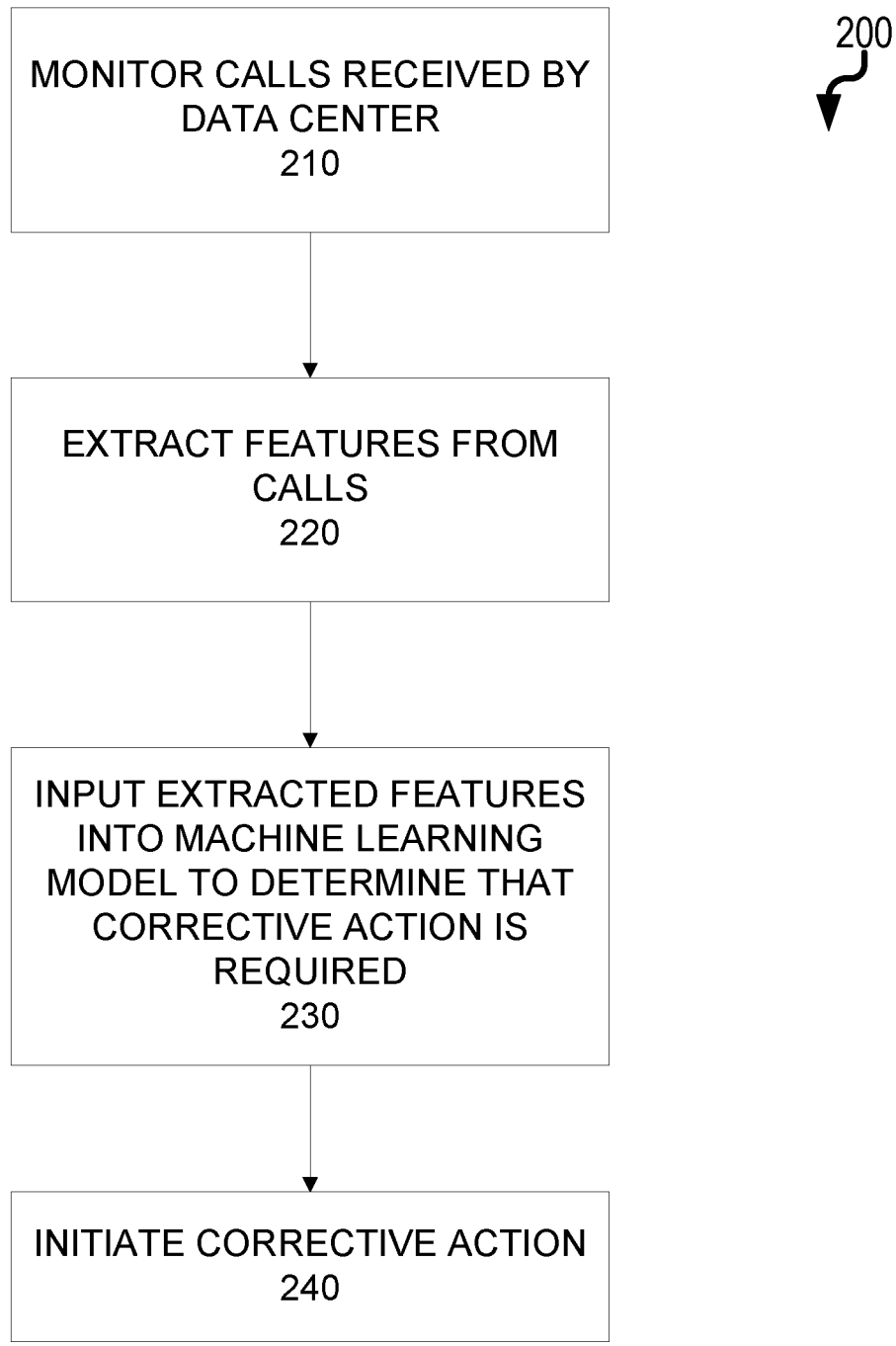
FIG. 2 is a process flow diagram illustrating a machine learning-based technique for preventing a data center malfunction.

FIG. 2 is a process flow diagram 200 in which, at 210, calls received by a data center that are associated with a request are monitored. Features are then extracted, at 220, from the monitored calls. With these extracted features, at 230, a machine learning model determines that the request will cause the data center to malfunction. In some variations, the machine learning model is trained using data derived from a transaction log for the data center. Based on this determination, at 240, at least one corrective action can be initiated to prevent the data center from malfunctioning.

Figure 3:
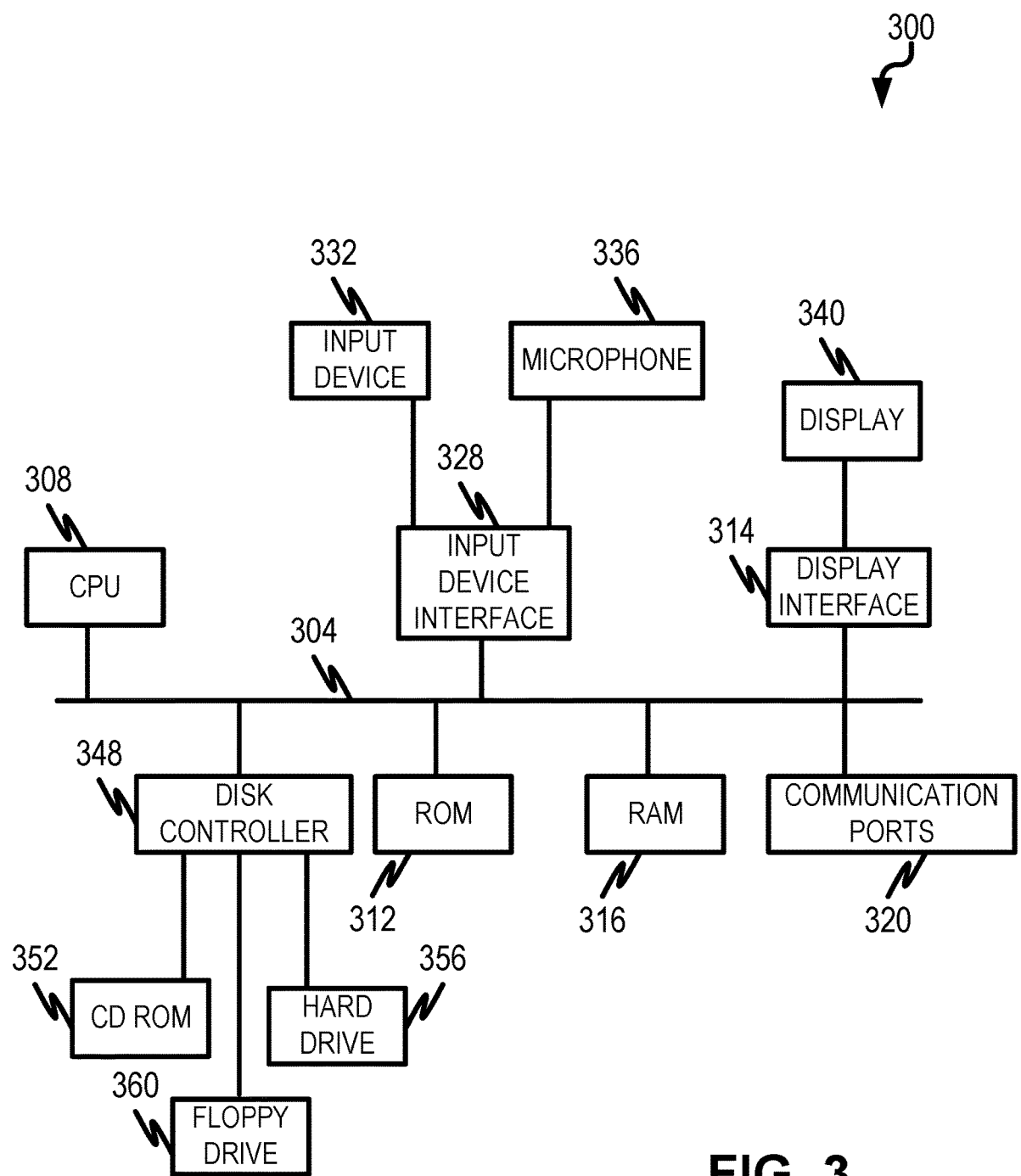
FIG. 3 is a diagram illustrating a computing device for implementing aspects of the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
monitoring calls received by a data center and associated with a request;
extracting features from the monitored calls;
determining, by a machine learning model using the extracted features, that the request will cause the data center to malfunction, the machine learning model being trained using data derived from a transaction log for the data center; and
initiating, in response to the determination, at least one corrective action to prevent the data center from malfunctioning.

2. The method of claim 1, wherein the corrective action comprises activating additional nodes within the data center to handle the request and future requests.

3. The method of claim 1, wherein the corrective action comprises: throttling subsequent calls or requests.

4. The method of claim 1, wherein the machine learning model comprises one or more of: a logistic regression model, a neural network, a support vector machine, or a random forest model.

5. The method of claim 1, wherein the machine learning model outputs a classification indicating whether the request is good or bad.

6. The method of claim 1, wherein the machine learning model outputs a numerical score within a pre-defined range.

7. The method of claim 1, wherein the features are selected from a group consisting of: pathway, implicated server, Hypertext Transfer Protocol (HTTP) status code, process time, central processing unit (CPU) consumption, processing time, number of exceptions, memory consumption, or number of data access calls.

8. A system comprising:
at least one data processor; and
memory storing instructions which, when executed by the at least one data processor, result in operations comprising:
monitoring calls received by a data center associated with a request;
extracting features from the monitored calls;
determining, by a machine learning model using the extracted features, that the request will cause the data center to malfunction, the machine learning model being trained using data derived from a transaction log for the data center; and
initiating, in response to the determination, at least one corrective action to prevent the data center from malfunctioning.

9. The system of claim 8, wherein the corrective action comprises activating additional nodes within the data center to handle the request and future requests.

10. The system of claim 8, wherein the corrective action comprises: limiting or throttling subsequent calls or requests.

11. The system of claim 8, wherein the machine learning model comprises one or more of: a logistic regression model, a neural network, a support vector machine, or a random forest model.

12. The system of claim 8, wherein the machine learning model outputs a classification indicating whether the request is good or bad.

13. The system of claim 8, wherein the machine learning model outputs a numerical score over a pre-defined range.

14. The system of claim 8, wherein the features are selected from a group consisting of: pathway, implicated server, Hypertext Transfer Protocol (HTTP) status code, process time, central processing unit (CPU) consumption, processing time, number of exceptions, memory consumption, or number of data access calls.

15. A non-transitory computer program product storing instructions which, when executed by at least one computing device, result in operations comprising:
　　monitoring calls received by a data center associated with a request;
　　extracting features from the monitored calls;
　　determining, by a machine learning model using the extracted features, that the request will cause the data center to malfunction, the machine learning model being trained using data derived from a transaction log for the data center; and
　　initiating, in response to the determination, at least one corrective action to prevent the data center from malfunctioning.

16. The computer program product of claim 15, wherein the corrective action comprises activating additional nodes within the data center to handle the request and future requests.

17. The computer program product of claim 16, wherein the corrective action comprises: limiting or throttling subsequent calls or requests.

18. The computer program product of claim 17, wherein the machine learning model comprises one or more of: a logistic regression model, a neural network, a support vector machine, or a random forest model.

19. The computer program product of claim 18, wherein the machine learning model outputs a classification indicating whether the request is good or bad.

20. The computer program product of claim 19, wherein the features are selected from a group consisting of: pathway, implicated server, Hypertext Transfer Protocol (HTTP) status code, process time, central processing unit (CPU) consumption, processing time, number of exceptions, memory consumption, or number of data access calls.

* * * * *